United States Patent
Hunt et al.

(10) Patent No.: US 6,748,063 B1
(45) Date of Patent: Jun. 8, 2004

(54) CALL DISTRIBUTION

(75) Inventors: Rowland G Hunt, Ipswich (GB); Simon Berry, Ipswich (GB)

(73) Assignee: Bristish Telecommunications public limited company, London (GB)

( * ) Notice: Subject to any disclaimer, the term of this patent is extended or adjusted under 35 U.S.C. 154(b) by 0 days.

(21) Appl. No.: 09/623,318

(22) PCT Filed: Mar. 17, 1999

(86) PCT No.: PCT/GB99/00815

§ 371 (c)(1),
(2), (4) Date: Aug. 31, 2000

(87) PCT Pub. No.: WO99/51013

PCT Pub. Date: Oct. 7, 1999

(30) Foreign Application Priority Data

Mar. 31, 1998 (EP) ............................................. 98302501
Mar. 31, 1998 (GB) ............................................. 9806919

(51) Int. Cl.$^7$ .......................... H04M 15/00; H04M 3/00
(52) U.S. Cl. ........................ 379/112.04; 379/112.01; 379/112.03; 379/112.1; 379/265.01; 379/265.02; 379/266.01
(58) Field of Search ..................... 379/112.01, 112.03, 379/112.04, 112.05, 112.06, 112.1, 265.01, 265.02, 266.04, 266.05, 32.01, 32.02, 220.01, 221.01, 221.07, 221.09, 221.14, 265.11, 265.12, 265.13, 266.01, 266.02, 266.07, 268, 269

(56) References Cited

U.S. PATENT DOCUMENTS

| | | | | | |
|---|---|---|---|---|---|
| 5,025,468 | A | * | 6/1991 | Sikand et al. | 379/266.08 |
| 5,291,552 | A | * | 3/1994 | Kerrigan et al. | 379/266.04 |
| 5,335,268 | A | * | 8/1994 | Kelly et al. | 379/112.05 |
| 5,530,744 | A | * | 6/1996 | Charalambous et al. | 379/266.08 |
| 5,590,188 | A | * | 12/1996 | Crockett | 379/265.02 |
| 5,680,448 | A | * | 10/1997 | Becker | 379/221.07 |
| 5,933,481 | A | * | 8/1999 | MacDonald | 379/137 |
| 6,178,235 | B1 | * | 1/2001 | Petersen et al. | 379/134 |

FOREIGN PATENT DOCUMENTS

EP 0526103 A2 2/1993

* cited by examiner

*Primary Examiner*—Curtis Kuntz
*Assistant Examiner*—Q. Tran
(74) *Attorney, Agent, or Firm*—Nixon & Vanderhye P.C.

(57) ABSTRACT

A call distribution system, suitable for use in a network supporting a telemarketing call center, maintains call counts at a global data server and at a number of transaction servers which are connected in common to the global data server. A choice is made of either the global count or the local count to be used in addressing a distribution map which determines the destination for a particular call. The distribution map may be a minimum error map which minimizes the deviation from a planned distribution ratio wherever a call sequence is terminated.

12 Claims, 6 Drawing Sheets

CALL DISTRIBUTION

BACKGROUND TO THE INVENTION

1. Field of the Invention

The present invention relates to call distribution in a communications network, and in particular to a system designed to support telemarketing.

2. Description of the Related Art

Telemarketing services involve, for example, a retailer operating a call answering centre in which a number of call answering agents take calls from customers. Large call answering centres may be split over several sites and may employ some hundreds of call answering agents. Typically, customers dial a single number, which may be an 0800 number, and each call is automatically directed within the network to an appropriate one of the sites, and subsequently to one of the call answering agents within the site. The system which is responsible for distributing the calls between different sites may use a call plan. This comprises a decision tree which is pre-programmed with criteria to be used in selecting a destination. For example, one criterion might be the time of day at which the call is made, with out-of-hours calls all being directed to one particular site. Another important criterion is the ratio of calls directed to different sites. Call plans may include proportional call distribution (PCD) nodes arranged to distribute calls in a given ratio. In order to ensure the most effective use of the available call answering agents, the telemarketing operator may require the network to distribute calls between sites in a specific ratio which is chosen to match the capacity of sites. For example, where the telemarketing operation is split between three sites with 30, 40 and 50 agents respectively, then the network will be required to distribute calls between the sites in the ratio 3:4:5. It is important that this call ratio should be maintained as accurately as possibly to ensure good occupancy at the call answering centres.

SUMMARY OF THE INVENTION

According to a first aspect of the present invention, there is provided a call distribution system suitable for use in a communications network, comprising:
a) a data server including
   a global call counter which is incremented in response to the arrival of successive calls;
b) a plurality of call transaction processors connected in common to the data server, each call transaction processor including
   a local call counter, and
   a call distribution map which is addressed using a call counter value to determine a call destination;
c) a controller which is responsive to the traffic rate and which determines, in dependence upon the traffic rate, whether a routing decision for a new call is made using the global call counter at the data server or is made using a local call counter.

This first aspect of the invention provides a platform which is able to implement a proportional call distribution (PCD) plan efficiently and accurately under widely varying traffic conditions. The platform combines distributed call processing by a number of call transaction processors with the use of a global data server which maintains a count of calls received for a given node across all the transaction processors in the platform. At low call rates, the routing decision for each new call is made by using the value of the global counter to address a distribution map. At higher call rates a local counter is used. This provides a high degree of control over call distribution, without the imposition of a bottleneck which might limit the capacity of the system.

Preferably when a routing decision is made using the global counter, an updated value of the global counter is returned from the data server to a call transaction processor, and a call destination is determined by addressing using the updated value of the global counter the distribution map located at the transaction processor.

In the preferred implementation of the invention, distribution maps are held only in the transaction processors, and all the distribution maps for a given PCD node are identical (that is to say, they are calculated from the same data). Although alternatively a distribution map may be located in the data server, and return destination number from data server to transaction processor, this requires communication of PCD node distribution fractions onto the data server. If the data server returns a simple count to the transaction processor, there is then no need for node distribution fractions to be held by the data server.

The distribution map may be a one-dimensional array listing different call destinations. The destinations are then allocated to incoming calls in the sequence determined by their order in the array. However, while the use of a global counter makes it possible to maintain the desired call distribution ratios with great accuracy, it also represents a potential bottleneck which might limit the ability of the platform to handle high call rates. The invention overcomes this potential limitation by providing each transaction server with an associated call rate detection mechanism. This may use, for example, a leaky bucket algorithm. Then once the call rate reaches a certain threshold, some call are withheld from the global counter, and instead are used to increment local counters in each of the transaction processors. It is then the local counter value which is used to address a local distribution map in the transaction processor in order to make a routing decision for a call.

Preferably each controller is programmed with a different respective call rate threshold.

The inventors have found that the performance of the platform can be significantly enhanced by using different call rate thresholds to determine the level at which the transaction processors begin to make use of local counters. The use of different thresholds for the onset of local processing eliminates the possibility of the local counters for a given PCD node, in the different local transaction processors, operating coherently. It is desirable to eliminate coherence as far as possible, since it tends otherwise to produce bursts of traffic at some destinations.

According to a second aspect of the present invention, there is provided a call distribution system suitable for use in a communications network, the system comprising
   a call counter which is incremented in response to the arrival of successive calls;
   a distribution map comprising a list of call destination identities, each identity occurring in the said distribution map with a frequency corresponding to a predetermined ratio of calls selected for the corresponding destination;
   a call routing processor which is arranged to address the distribution map in dependence upon a current value in the call counter and to assign a call destination to an incoming call accordingly.

Preferably the distribution map is a minimum error map in which the sequence of the destination identities in the map is such that if a call sequence is terminated at any point in the map the deviation of the proportion of call directed to different destinations from a predetermined target ratio is minimised. It is found that the use of a minimum error distribution map reduces the bunching of calls to particular destinations, and further improves the call statistics.

According to a second aspect of the present invention, there is provided a method of distributing calls in a communications system comprising;

a) maintaining a global count of the calls for a respective call distribution node;

b) maintaining locally at a call transaction processor a local count of the calls for the respective call distribution node processed by the said call transaction processor;

c) selecting either a value of the global count or a value of the local count depending on call traffic levels;

d) addressing a call distribution map using the value selected in step(c) and determining thereby the destination to which a call is directed.

In a typical implementation of the invention, there are a plurality of transaction processors, and a different number of PCD nodes. There may be several PCD nodes per call plan, many call plans per customer, and many customers handled by a single call distribution system. Each active PCD node has a global counter at the global data server (GDS) and a local counter at each of the plurality of transaction processors. One or other of the global and local counters is used to address the distribution map for a given PCD node.

The present invention also encompasses a communications network including a call distribution system in accordance with any of the preceding aspects of the invention.

BRIEF DESCRIPTION OF THE DRAWINGS

Systems embodying the present invention will now be described in future detail, by way of example only, with reference to the accompanying drawings in which.

DESCRIPTION OF EXAMPLES

A telecommunications network which uses an IN (Intelligent Network) architecture includes a service control point 1, which is also termed herein the Network Intelligence Platform (NIP). The service control point 1 is connected to trunk digital main switching units (DMSU's) 2,3 and to digital local exchanges (DLE's) 4,5. Both the DMSU's and the DLE's function as service switching points (SSP's). At certain points during the progress of a call, the SSP's transfer control of the call to the service control point. The service control point carries out functions such as number translation and provides a gateway to additional resources such as a voice messaging platform. In the present example, the service control point 1 is arranged to use a call plan to direct calls made to an 0800 number to one of a plurality of answering centres 7, 8, 9 at different sites.

Figure 1:
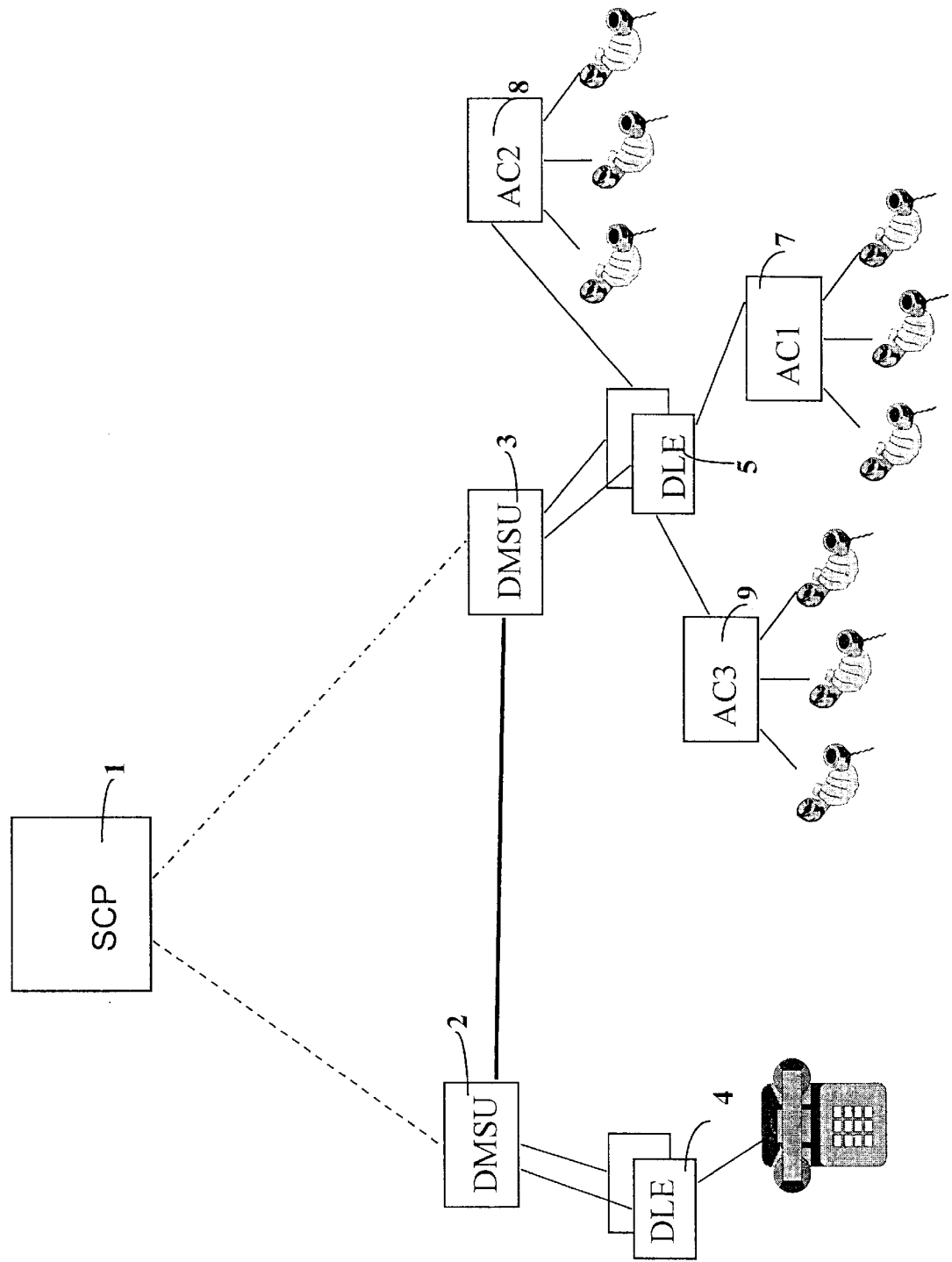
FIG. 1 is a schematic of a network embodying the present invention.
Figure 2:
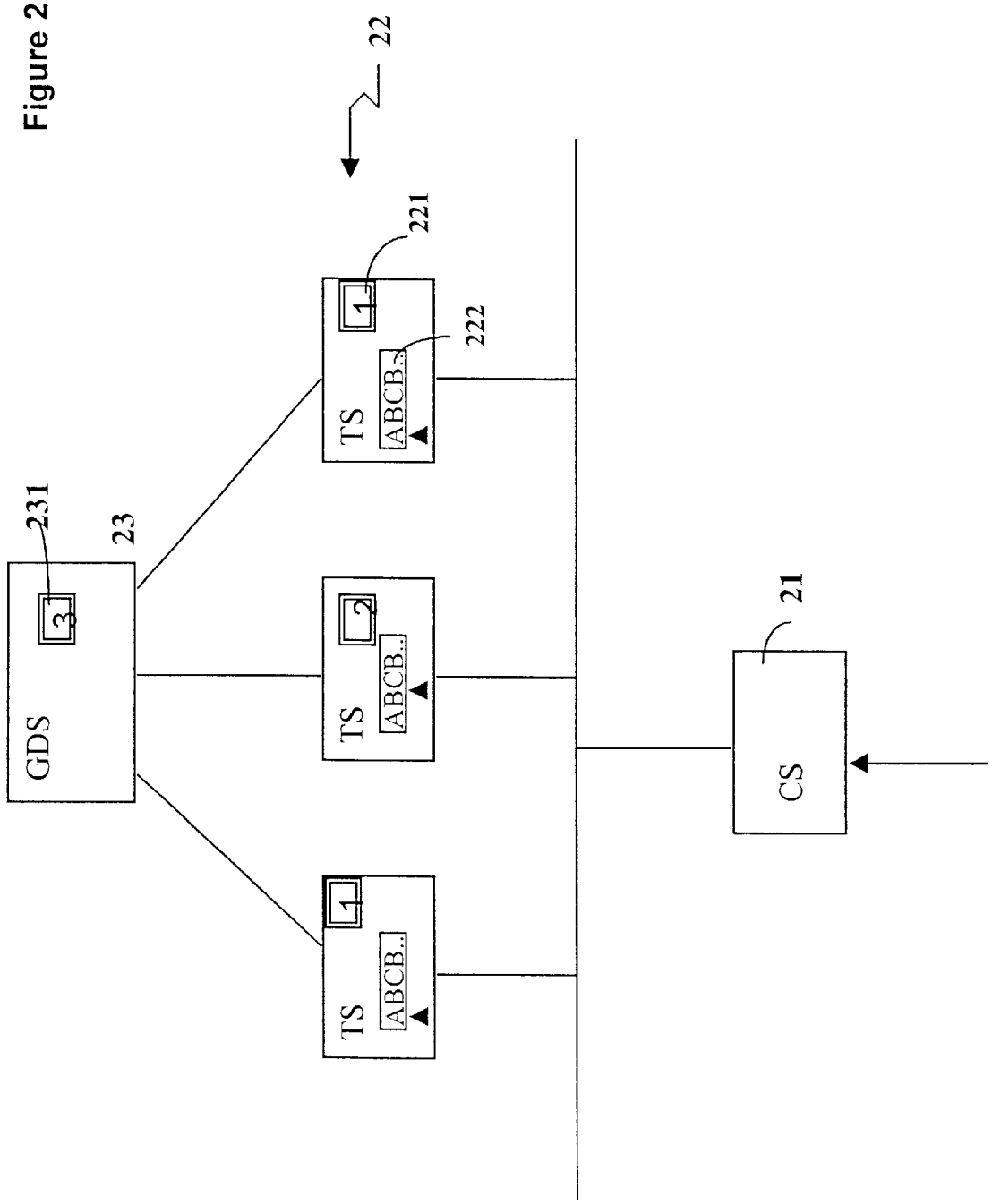
FIG. 2 is a schematic of the service control point of the network of FIG. 1.

FIG. 2 shows the architecture of the service control point in this example. It includes a communications server 21 which communicates with the service switching points via an SS7 signalling channel. Call related signalling which is received by the communications server 21 is passed to one of a number of transaction servers 22. The transaction servers 21 are connected in common to a global data server 23 which, in this example, collects call statistics and also, as will be further described, maintains a global counter 231. Each transaction server includes a local counter 221 and a local copy 222 of a distribution map for a given proportional call distribution (PCD) node.

Figure 3:
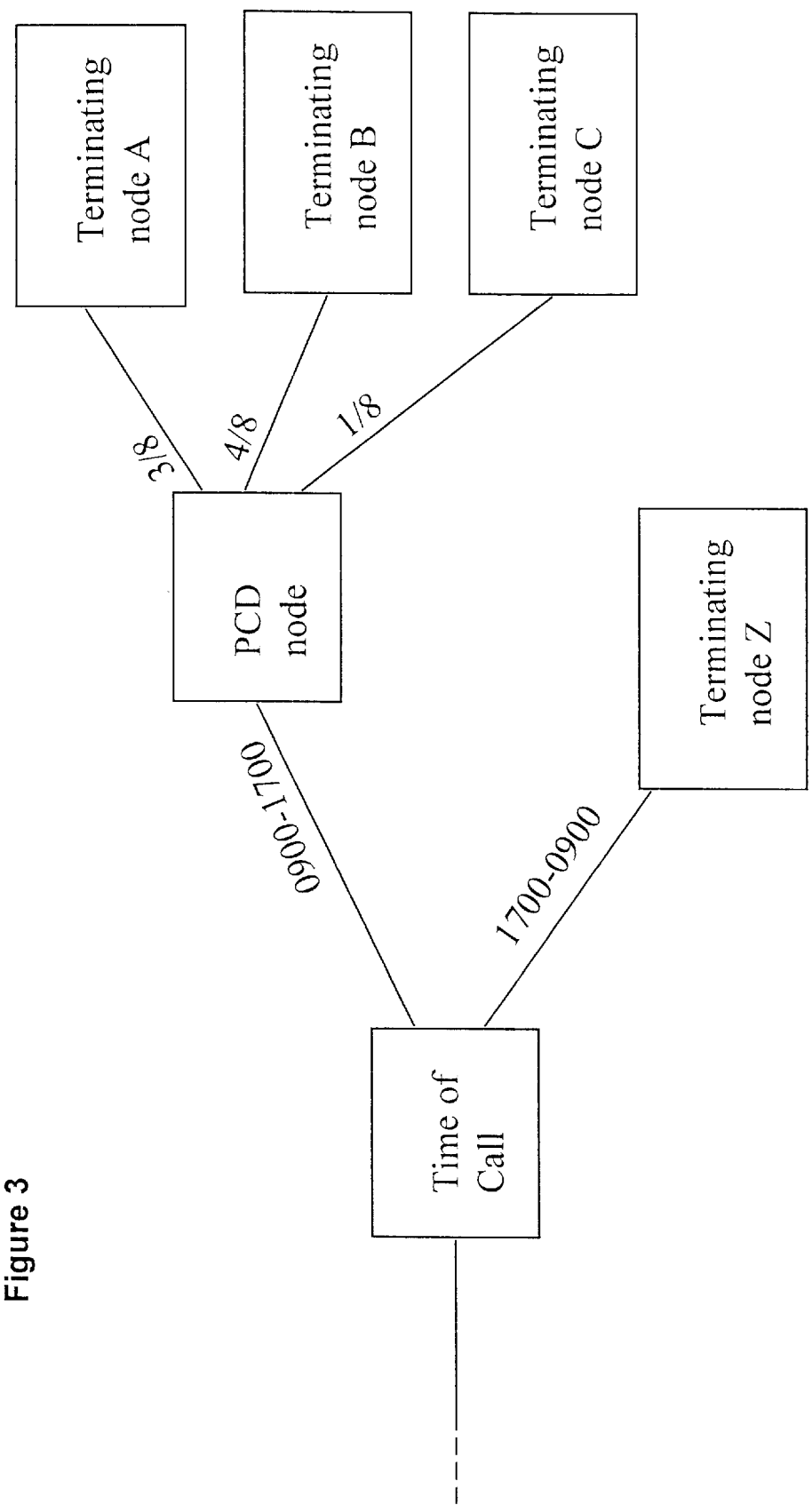
FIG. 3 is a diagram showing part of a call plan.

The global data server and the transaction servers together perform number translation for incoming calls which are made to the 0800 number of a call answering centre. A number is returned to the originating exchange as the destination number. This number is determined using a call plan. FIG. 3 shows part of a typical call plan. This includes a time-dependent node 31 which routes the call depending on the time of day. When calls are made outside office hours, then the destination number is chosen to be that of a single answering centre site which offers a round-the-clock operation. The other branch from the time-dependent node goes to a proportional call distribution (PCD) node. This splits calls between 3 terminating nodes, labelled A–C. Each terminating node is associated with a particular answering centre site and returns a corresponding destination number. The PCD node is arranged to split calls between the different terminating nodes in a specified ratio. In the present example the ratio A:B:C is 3:4:1. The distribution maps in the global server and the transaction servers are selected to ensure that calls are distributed in the specified ratio. In this example the map is a one-dimensional array: (A,B,C,B,A,B,A,B). The different destinations occur in this map with a frequency which is matched to the desired ratios. Also, this distribution is selected so that if the sequence is terminated at any point the cumulative error by comparison with the desired ratios is minimised.

Consider a 3-branch node with distribution fractions $3/8$ to A, $1/2$ to B, $1/8$ to C. Determine a distribution array of length 8 (the lowest common denominator) as follows: the first element of the array is set to the destination with the highest distribution fraction, here B. In use, the 1st, 9th, 17th, etc calls will go to destination B. Now determine the best destination for the second call as follows: the actual distribution of the single call distributed so far is $0/1$ to A, $1/1$ to B, and $0/1$ to C. The distribution fractions should be made as close as possible to $3/8$, $4/8$, $1/8$ respectively. If the second call were sent to A, the actual distribution fractions after the second call would be $1/2$, $1/2$, $0/2$ respectively. If the second call were sent to B, the fractions would be $0/2$, $2/2$, $0/2$ respectively. If the second call were sent to C, the fractions would be $0/2$, $1/2$, $1/2$ respectively. Summing the moduli of the errors for the three possible destinations of the second call gives:

$|(1/2-3/8)|+|(1/2-1/2)|+|(0/2-1/8)|=2/8$ if the call goes to $A$;

$|(0/2-3/8)|+|(2/2-1/2)|+|(0/2-1/8)|=8/8$ if the call goes to $B$;

$|(0/2-3/8)|+|(1/2-1/2)|+|(1/2-1/8)|=6/8$ if the call goes to $C$.

Hence the optimum destination for the second call (the destination which minimises the distribution error as far as possible) is A. Continuation of this process for the 3rd, 4th, . . . 8th call gives a complete distribution map B, A, . . . .

In operation, the distribution map is addressed using the value in the call counter, for example at the global data server. This counter is incremented, modulo the length of the map, each time a new call is received. Thus for the first call the first value in the map, that is A, is selected as the terminating node, and the call is routed to the corresponding call answering site. For the next call, the counter is incremented to a value '2' and the second value in the map, B, determines the terminating node, and so on. On receiving the eighth call the counter, which is operating modulo 7, is reset to a value of '1'.

Each of the transaction servers 22 includes a call rate detector. This may use a leaky bucket algorithm as described in the present applicant's International Patent Application PCT/GB 94/02512. The leaky bucket algorithm uses a counter which is decremented regularly at a fixed rate, the leak rate. The bucket is assigned a predetermined fixed capacity. A drip is added to the bucket, that is to say the counter is incremented, each time an initial message is received for a new call by the respective transaction server and the call is accepted. If the call rate exceeds the leak rate, then the bucket fills until a threshold value corresponding to its maximum capacity is reached. Any further calls then overflow the bucket, until the next leak decrements the counter.

For each call which fits into the bucket, the transaction server passes a request for processing to the global data server. The request includes the identity of the relevant PCD node and the address of the requesting transaction processor, so that the GDS can address its reply correctly.

In response to such a request the global counter is incremented, and its new value is returned to the requesting transaction server. The transaction server uses the received counter value to address its local distribution map, and hence determines the destination number for the call. The transaction server in turn passes the destination number to the originating SSP which then routes the call to the selected answering centre site.

When a call overflows the bucket, then it is handled locally at the transaction server. The transaction server maintains a local counter for each PCD node. When a new overflow call is received, then the local counter is incremented, and a local distribution map is addressed to determine the relevant terminating node and the corresponding destination number.

Figure 4I:
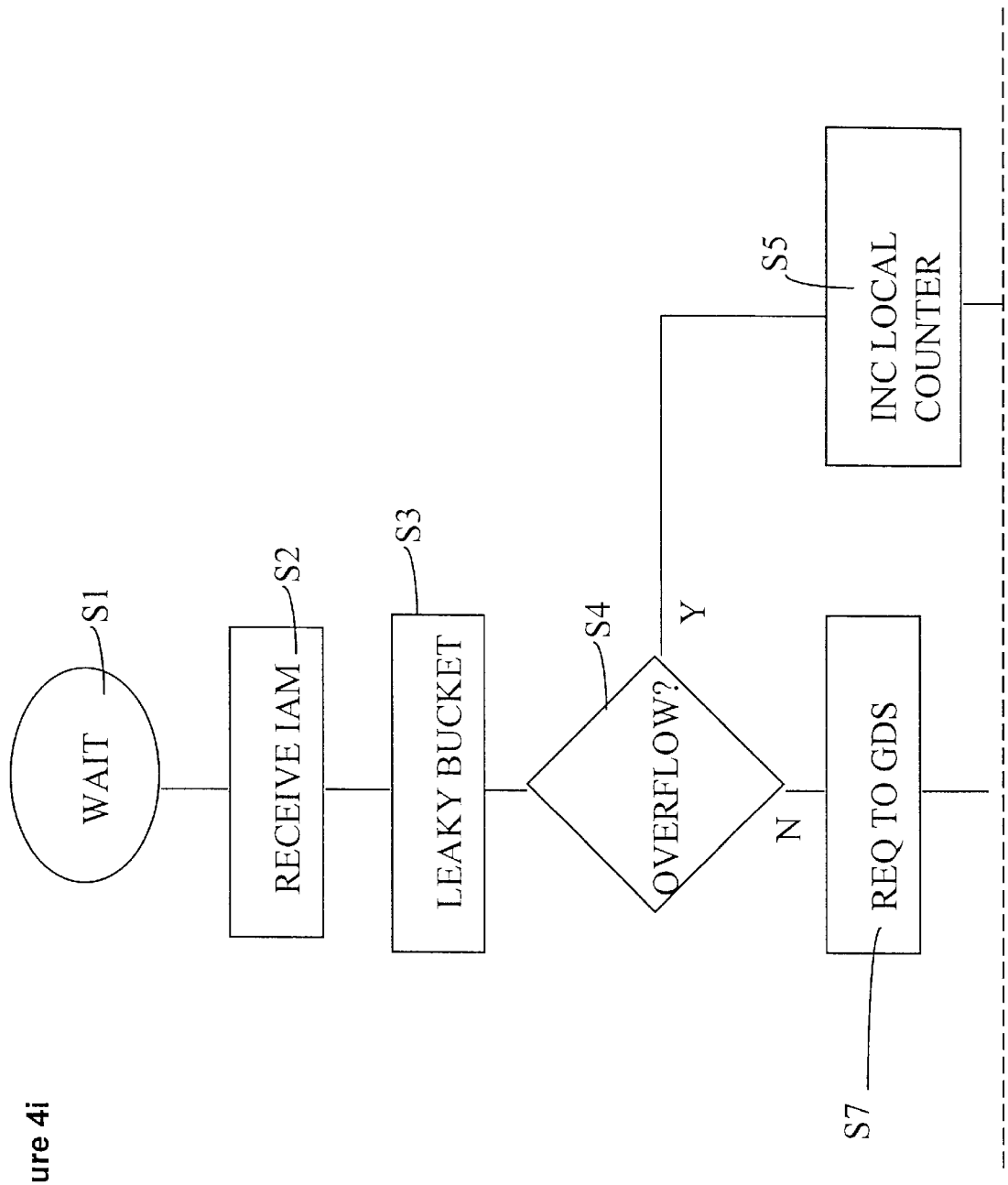
FIG. 4 is a flow diagram.
Figure 4I:
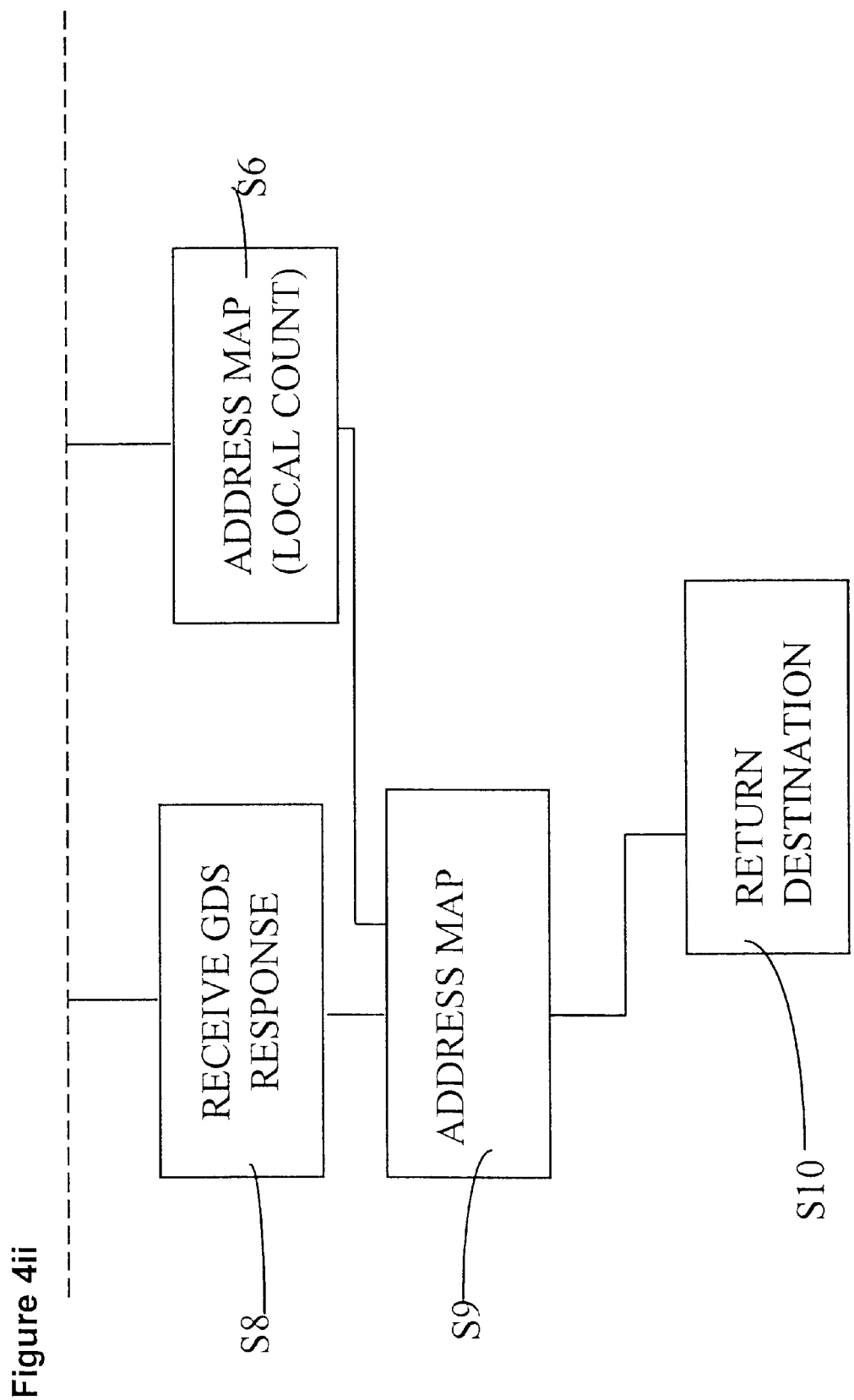

FIG. 4 is a flow diagram illustrating the process outlined above. In the initial state, S1, the NIP is waiting to receive signalling for a new call. In step s2 the initial address message (IAM) for a new call is received. In step s3 the new call triggers operation of the leaky bucket algorithm. At step s4 the transaction server makes a decision on the further processing of the call depending on whether the call overflows the leaky bucket. If it does overflow, then in step s5 the local counter is incremented and in step s6 a local copy of the distribution map is addressed. If the call does not overflow the leaky bucket then in step s7 the transaction server sends a request for processing to the global data server and in step s8 the global counter is incremented and the updated value of the global count is returned to the requesting transaction server. In step s9 the distribution map is addressed. In step s10 the terminating node selected by addressing either locally or globally the distribution map is used to determine the appropriate destination number, which destination number is then returned from the transaction server to the originating exchange.

Analysis by the inventors has shown that if each transaction server uses the same leak rate for the leaky bucket algorithm, then the counters in the different transaction servers sometimes become coherent as a result of statistical fluctuations in call arrivals, that is to say they all point to approximately the same position in the distribution map. This causes bursts and lulls in the call rates to individual destination sites. It can take several call holding times before such coherence is broken up by statistical fluctuations in the number of calls handled by each transaction server. The burstiness in the call rates is particularly marked for sites which receive a relatively small fraction, e.g. a tenth, of the traffic through a particular PCD node. In this case an individual destination may receive a burst of calls, which fill up the available lines. Hence some of the calls in the burst encounter termination-busy. The burst will be followed by a lull in which disconnecting calls are not replaced by new offered calls. The result is a reduction in average destination occupancy.

The service control point in the present example overcomes these problems by using a different value for the leak rate in the leaky bucket algorithm in different transaction servers. Then, when traffic is high enough to cause overflow from GDS to local control, the rate of calls handled locally at each transaction server will differ by the difference in the leaky-bucket rates. Local pointers will then move at different rates through the local distribution maps and any coherence will be short-lived. For example if the leak rates average to 1.0 cps (calls per second) per transaction server, but (at a given site) the 4 transaction servers have actual leak rates of ½, ⅚, ⅞, 3/2, then if the traffic rate per transaction server is R=3/2 the rates of calls overflowing, to be handled locally at the transaction servers, will be 1, ⅔, ⅓, 0 cps respectively. (The GDS will handle ½+⅚+⅞+3/2 cps, and the distribution of these calls will be perfect). Then if all local counters start coherent and the smallest distribution fraction at the node is ¹⁄₁₀, coherence will be removed (local counters will be uniformly spread through the distribution map) after $^{10}/_{1}$=10 s. In this example the counters will "re-cohere" e.g. after 10/(⅓)=30 s but this happens only as a result of the choice of a uniform traffic rate exactly equal to the highest leak rate and in reality this is unlikely to be sustained. Over this period the "fastest" local distribution receives 30 calls and would probably have a standard deviation of 6 calls (overflow traffic is burstier than total traffic), so statistical fluctuations would "wash out" much of the coherence over this longer time period.

In this way, when the traffic is high enough to cause overflow from the global data server to local control, the rate of call handled locally at each transaction server differs by the difference in the leaky bucket rates. Local pointers then move at different rates through the local distribution maps and any coherence is very short lived.

Figure 5:
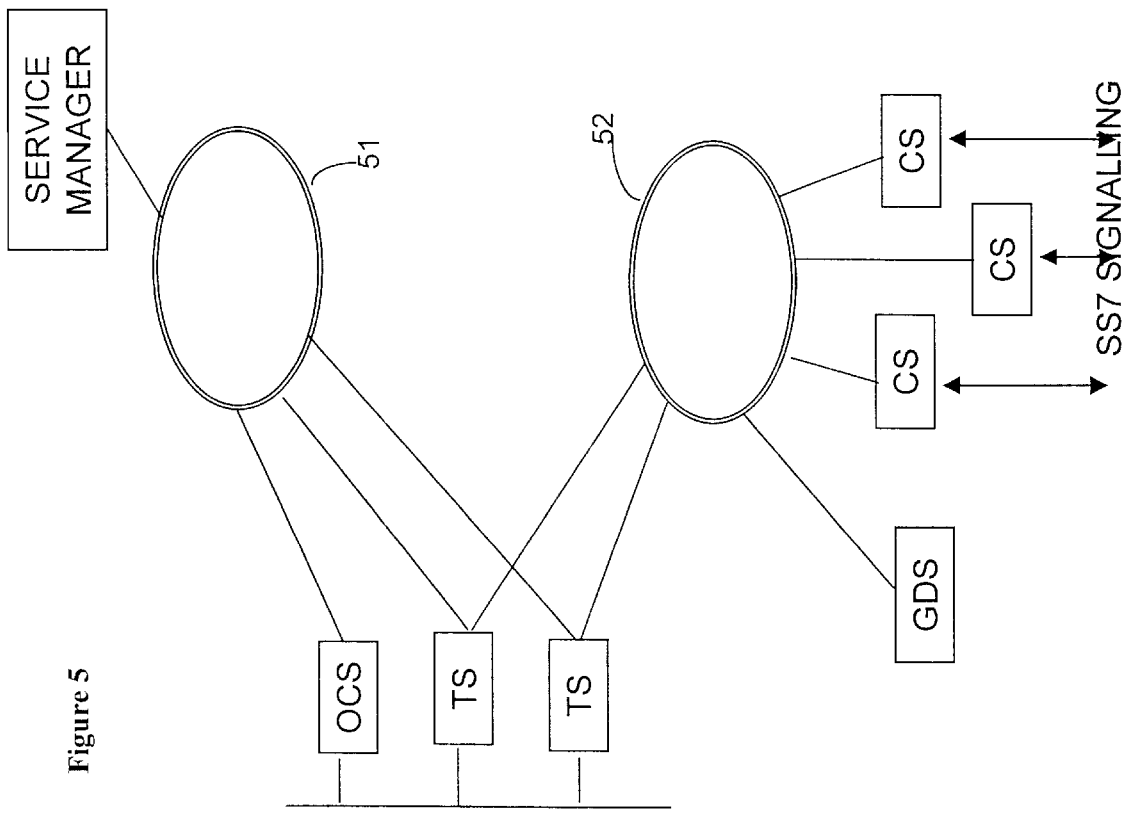
FIG. 5 is a diagram showing in future detail the service control point of FIG. 2.

FIG. 5 shows in further detail the architecture of the SCP described above with reference to FIG. 2. A service management server is connected via an FDDI optical fibre LAN to an overload control server (OCS) and to transaction servers (TS). The transaction servers implement advanced service control functions such as proportional call distribution feature described above. The OCS and transaction servers are connected via a second FDDI LAN to communications servers (TS) which are connected to the SS7 (ITU Signalling System no. 7) signalling network. The global data server (GDS) is also connected to this second LAN. Each of the servers, that is the GDS, the OCS, the transaction servers and communication servers may be implemented as a respective computer workstation using, for example a Sun SPARC or a Digital (Compaq) ALPHA microprocessor. Elements such as the global call counter, the local call counters and the controller are then implemented using the memory, registers and processors of these servers under the control of appropriate software modules.

What is claimed is:

1. A call distribution system suitable for use in a communications network, the system comprising:

a data server including a global call counter which is incremented in response to the arrival of successive calls received by a plurality of call transaction processors connected in common to the data server, each call transaction processor including a local call counter; and
a call distribution map which is addressed using a call counter value to determine a call destination; and
a controller which is responsive to the traffic rate and which determines for each call transaction processor, in dependence upon the traffic rate received by said call transaction processor, whether a routing decision for a new call is made using a call counter value generated by the global call counter or a call counter value generated by one of the plurality of local call counters.

2. A call distribution system suitable for use in a communications network, comprising:
   a) a data server including a global call counter which is incremented in response to the arrival of successive calls;
   b) a plurality of call transaction processors connected in common to the data server, each call transaction processor including:
      a local call counter, and
      a call distribution map which is addressed using a call counter value to determine a call destination; and
   c) a controller which is responsive to the traffic rate and which determines, in dependence upon the traffic rate, whether a routing decision for a new call is made using the global call counter at the data server or is made using a local call counter;
   wherein the data server is arranged to communicate an updated value of the global call counter to a call transaction processor, and the transaction processor is arranged to use the updated value communicated by the data server to address a call distribution map held locally at the transaction processor.

3. A call distribution system suitable for use in a communications network, the system comprising
   a call counter which is arranged to be incremented in response to the arrival of successive calls at a call transaction processor;
   a distribution map comprising a list of call destination identities, each identity occurring in the distribution map with a frequency corresponding to a predetermined ratio of calls selected for the corresponding destination;
   a call routing processor which is arranged to address the distribution map in dependence upon a current value in the call counter and to assign a call destination to an incoming call accordingly, wherein the call counter is updated by a call transaction processor arranged to use an updated counter value communicated by a data server to enable the call routing processor to address a call distribution map held locally at the call transaction processor.

4. A call distribution system suitable for use in a communications network, comprising:
   a) a data server including a global call counter which is incremented in response to the arrival of successive calls;
   b) a plurality of call transaction processors connected in common to the data server, each call transaction processor including:
      a local call counter, and
      a call distribution map which is addressed using a call counter value to determine a call destination; and
   c) a controller which is responsive to the traffic rate and which determines, in dependence upon the traffic rate, whether a routing decision for a new call is made using the global call counter at the data server or is made using a local call counter;
   wherein the distribution map is a minimum error map in which a sequence of destination identities in the map is such that if a call sequence is terminated at any point in the map a deviation of a proportion of calls directed to different destinations from a predetermined target ratio is minimised.

5. A system according to claim 3 including a call counters associated with the call transaction processor.

6. A system according to claim 1, in which each of the plurality of call transaction processors includes a respective traffic rate detector, and the traffic rate detectors at different respective transaction processors are programmed with different respective rate thresholds.

7. A method of distributing calls in a communications system comprising:
   a) maintaining a global count of the calls received by a plurality of call transaction processors for a respective call distribution node;
   b) maintaining locally at each of the plurality of call transaction processors a local count of the calls for the respective call distribution node processed by the call transaction processor;
   c) selecting, for each of said plurality of call transaction processors, either a value of the global count communicated to the call transaction processor or a value of the local count depending on call traffic levels at said call transaction processor; and
   d) addressing a call distribution map using the value selected in step (c) and determining thereby the destination to which a call is directed;
   wherein the selection of either the value of the global count or the value of the local count depends on a rate of incoming calls for said transaction processor.

8. A method according to claim 7, including programming a plurality of traffic rate detectors with different rate thresholds for different respective transaction processors, and at a call transaction processor selecting a value of the local count in step (c) whenever the respective rate threshold is exceeded.

9. A method of distributing calls in a communications system comprising:
   a) in response to a new call, incrementing a call counter;
   b) addressing, using a value of the call counter, a distribution map, which distribution map comprises a list of call destination identities, each identity occurring in the distribution map with a frequency corresponding to a predetermined ratio of calls selected for the corresponding destination; and
   c) directing a call to a destination selected in step (b);
   wherein the distribution map is a minimum error map in which a sequence of destination identities in the map is such that if a call sequence is terminated at any point in the map a destination of a proportion of calls directed to different destinations from a predetermined target ratio is minimized.

10. A method of distributing calls in a communications system comprising:
    a) maintaining a global count of the calls for a respective call distribution node;
    b) maintaining locally at a call transaction processor a local count of the calls for the respective call distribution node processed by the call transaction processor;

c) selecting either a value of the global count or a value of the local count depending on call traffic levels;

d) addressing a call distribution map using the value selected in step (c) and determining thereby the destination to which a call is directed;

wherein the distribution map is a minimum error map in which a sequence of destination identities in the map is such that if a call sequence is terminated at any point in the map a deviation of a proportion of calls directed to different destinations from a predetermined target ratio is minimized.

11. A call distribution system as claimed in claim 1, wherein the traffic rate at which the controller determines whether a routing decision for a new call is made using a global call counter or a local call counter differs for each of said plurality of call transaction processors.

12. A method as claimed in claim 7, wherein said incoming call rate determining which count is selected to address said distribution map differs for each of said plurality of call transaction processors.

* * * * *